United States Patent

[11] 3,573,457

| [72] | Inventors | Gary B. Grant<br>St. Paul, Minn.;<br>Marvin J. Schmitz, North Hudson, Wis. |
|---|---|---|
| [21] | Appl. No. | 810,491 |
| [22] | Filed | Mar. 26, 1969 |
| [45] | Patented | Apr. 6, 1971 |
| [73] | Assignee | Minnesota Mining and Manufacturing Company<br>St. Paul, Minn. |

[54] LUMINESCENT PATTERN STRUCTURE
8 Claims, 3 Drawing Figs.

[52] U.S. Cl. ................................................ 250/71, 250/77
[51] Int. Cl. ...................................................... H01j 1/72
[50] Field of Search ............................................ 250/71, 77, 80

[56] References Cited
UNITED STATES PATENTS

| 2,790,350 | 4/1957 | Cameron ...................... | 250/77X |
| 2,885,561 | 5/1959 | Lange .......................... | 250/77 |
| 2,904,689 | 9/1959 | Masi et al. ................... | 250/77X |

*Primary Examiner*—James W. Lawrence
*Assistant Examiner*—Davis L. Willis
*Attorney*—Kinney, Alexander, Sell, Steldt and Delahunt ABSTRACT: A luminescent pattern structure wherein luminescent material defining a reference pattern is supported in grooves etched in a transparent member, and an opaque material located in the grooves between the luminescent material and the transparent member prevents appreciable halation due to light emitted by the luminescent material. This luminescent pattern structure providing a reference pattern is coextensive with a target surface capable of displaying an image to enable viewing of the reference pattern superimposed on the image.

Patented April 6, 1971 3,573,457

INVENTORS
MARVIN J. SCHMITZ
BY GARY B. GRANT
Kinney, Alexander,
Sell, Steldt & DeLaHunt
ATTORNEYS

LUMINESCENT PATTERN STRUCTURE

SUMMARY OF THE INVENTION

The present invention provides a luminescent pattern structure wherein appreciable halation is prevented by locating an opaque material between the luminescent material defining a reference pattern and the transparent member supporting the luminescent material in order to prevent appreciable dispersion of light emitted by the luminescent material into the transparent member and resultant reflection of such light from the surfaces of the transparent structure.

In a luminescent pattern structure in which the luminescent material is supported in grooves, opaque material is located in the grooves between the luminescent material and the transparent member to substantially prevent light transmission between the luminescent material and the transparent member. The intensity of the light emitted from the exposed surface of the luminescent material is enhanced by using a highly reflective material as the opaque material.

DESCRIPTION OF THE PREFERRED EMBODIMENTS

Figure 1:
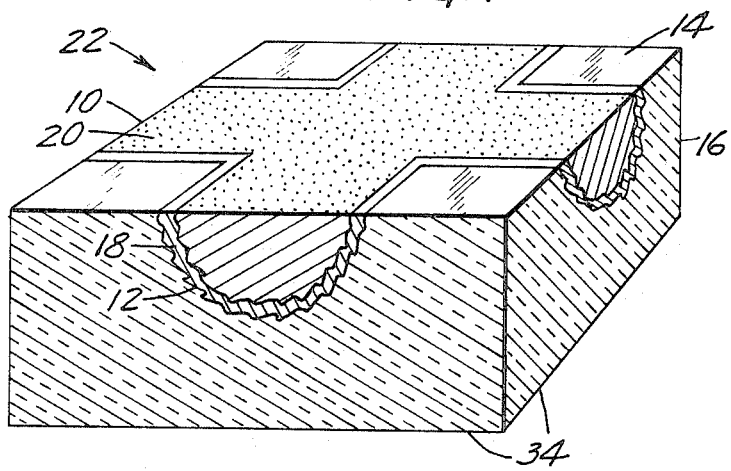
FIG. 1 is an isometric view of a partial section of a preferred embodiment of the luminescent pattern structure of the present invention.
Figure 2:
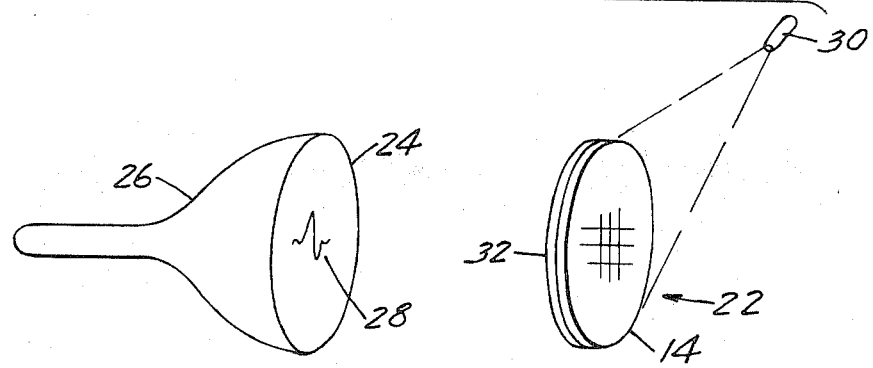
FIG. 2 is a diagrammatic view of the luminescent pattern structure of FIG. 1 positioned in front of the fluorescent face of a cathode ray tube in an exemplary application.

In the preferred embodiment shown in FIGS. 1 and 2, luminescent material such as fluorescent material 10 sold under the trade designation "Shannon Glow No. 30 invisible green" by the manufacturer, Shannon Luminous Materials Company, Los Angeles, California, is placed in grooves 12 etched in the first surface 14 of a transparent member, such as an optical glass plate 16, to define a reference pattern, such as a graticule pattern. An opaque material such as a silver layer 18 is located in the grooves 12 between the fluorescent material 10 and the glass plate 16 to prevent appreciable transmission of light between the fluorescent material 10 and the glass plate 16. By using a highly reflective material such as silver for the opaque material, the intensity of the light emitted from the fluorescent material 10 is increased by the reflection of light from the silver layer 18 toward the exposed surface 20 of the fluorescent material 10.

In manufacturing the luminescent pattern structure 22 of the present invention, the grooves 12 defining the graticule pattern are etched in the first surface 14 of the glass plate 16. Silver is then deposited in the grooves 12 by spraying the first surface 14 of the glass plate 16 to a thickness which provides substantial opacity. Silver deposited on the first surface 14 of the glass plate 16 outside of the grooves 12 is then removed and recovered by scraping. The grooves 12 are then filled with fluorescent material 10, which is wiped onto the first surface 14 of the glass plate 16. The fluorescent material 10 deposited outside of the grooves 12 is also removed by scraping.

In a preferred application, the luminescent pattern structure 22 is positioned in front of a target surface such as the fluorescent face 24 of a cathode ray tube 26 in order to align the graticule pattern with an image such as waveform 28 produced on the fluorescent face 24 of the cathode ray tube 26. The first surface 14 of the glass plate 16 of the luminescent pattern structure 22 is positioned to face away from the cathode ray tube 26, thereby exposing the fluorescent material 10 for irradiation by radiant energy, such as actinic radiation from an ultraviolet light source 30, such as a GE Model F6T5-ABLB fluorescent light bulb. A filter 32, such as a layer of an ultraviolet absorbing material manufactured by GAF Corporation of New York and sold under the trade designation "Uvinul D-50," is placed between the second surface 34 of the glass plate 16 and the cathode ray tube 26 in order to prevent actinic radiation, such as the ultraviolet light emitted by ultraviolet light source 30 from striking the fluorescent face 24 of the cathode ray tube 26. The second surface 34 of the glass plate 16 is coextensive with the first surface 14. Alternatively, the glass plate 14 includes an ultraviolet light absorbing material.

Figure 3:
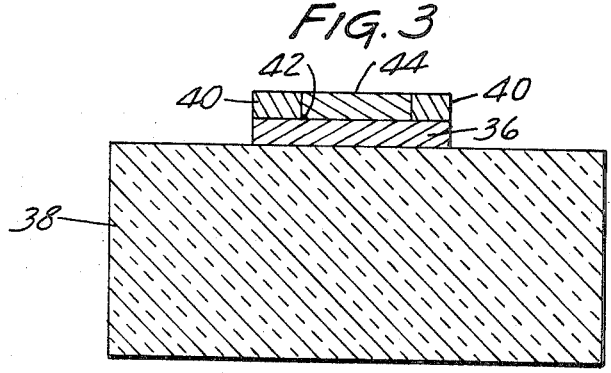
FIG. 3 is a cross-sectional elevation view of a partial section of another embodiment of the luminescent pattern structure of the present invention.

In another embodiment (FIG. 3), silver layers 36 are deposited on a glass plate 38 by a silk screening process in the graticule pattern. Second silver layers 40 are then deposited on top of and along the edges of the silver layer 36 in order to define a channel 42. Fluorescent material 44 is then deposited in the channel 42. Thus, appreciable transmission of light between the fluorescent material 44 and the glass plate 38 is prevented. The second silver layers 40 may be eliminated if the width of the individual silver layers 36 in relation to the width and height of the individual layers of fluorescent material 44 is sufficient to prevent appreciable transmission of light between fluorescent material 44 and the glass plate 38.

We claim:

1. In an apparatus in which a luminescent pattern structure providing a reference pattern is coextensive with a target surface capable of displaying an image to enable viewing of said reference pattern superimposed on said image, a luminescent pattern structure comprising:

a transparent member having coextensive first and second light transmissive surfaces, which first surface faces away from the target surface;

an exposed luminescent material supported by the first surface of the transparent member and defining a reference pattern;

which luminescent pattern structure is characterized by the improvement comprising;

an opaque material located on the first surface of the transparent member in said reference pattern in a layer between the transparent member and the luminescent material for preventing appreciable transmission of light between the luminescent material and the transparent member.

2. In an apparatus according to claim 1, a luminescent pattern structure further characterized by the improvement that the opaque material is highly reflective.

3. In an apparatus according to claim 1, a luminescent pattern structure in which the luminescent material includes a fluorescent material.

4. In an apparatus according to claim 1 in which the exposed luminescent material is located in grooves defining said reference pattern in the first surface of the transparent member, a luminescent pattern structure further characterized by the improvement that the opaque material is located in said reference pattern in said grooves in the first surface of the transparent member between the transparent member and the luminescent material for preventing appreciable transmission of light between the luminescent material and the transparent member.

5. In an apparatus according to claim 4, a luminescent pattern structure further characterized by the improvement that the opaque material is highly reflective.

6. In an apparatus according to claim 4, a luminescent pattern structure in which the transparent member is a glass plate, the opaque material is silver, and the reference pattern is a graticule pattern.

7. In an apparatus according to claim 4, a luminescent pattern structure in which the luminescent material includes a fluorescent material.

8. In an apparatus according to claim 7 in which the target surface is the fluorescent face of a cathode ray tube, a luminescent pattern structure in which the transparent member is a glass plate, the opaque material is silver, and the reference pattern is a graticule pattern.

UNITED STATES PATENT OFFICE
CERTIFICATE OF CORRECTION

Patent No. 3,573,457  Dated April 6, 1971

Inventor(s) Gary B. Grant and Marvin J. Schmitz

It is certified that error appears in the above-identified patent and that said Letters Patent are hereby corrected as shown below:

Column 1, line 2, insert the following:

-- <u>Background of the Invention</u>

The present invention relates to an improved lumi­cent pattern structure such as a fluorescent graticule structure, which is coextensive with a target surface such a the fluorescent face of a cathode ray tube which is capable of displaying an image to enable viewing of the reference pattern superimposed on the displayed image.

A problem common to luminescent pattern structure of the prior art is halation. In a typical prior art struc a luminescent material arranged in a reference pattern is supported by a transparent member. The luminescent materia is usually supported in grooves which are etched in the tra parent member in the reference pattern. A halation effect produced when the luminescent material is irradiated. This halation is due to the light which is emitted from the transparent material being reflected from the surfaces of the transparent member or from surfaces of adjacent trans­parent members, such as a glass face plate of a cathode ray tube. Halation is particularly compounded by reflection of light from any irregular surfaces in the transparent member such as the surfaces of flaws or of the etched grooves. --

Column 1, line 72, change "F6T5-ABLB" to -- F6T5-BLB --.

Signed and sealed this 17th day of August 1971.

(SEAL)
Attest:

EDWARD M. FLETCHER, JR.
Attesting Officer

WILLIAM E. SCHUYLER, JR
Commissioner of Patents